US010001055B2

(12) United States Patent
Koyama et al.

(10) Patent No.: US 10,001,055 B2
(45) Date of Patent: Jun. 19, 2018

(54) ENGINE-DRIVEN WORKING MACHINE HOUSED IN OUTER CASE WITH VIBRATION ISOLATING SUPPORT

(71) Applicant: HONDA MOTOR CO., LTD., Tokyo (JP)

(72) Inventors: Hiroshi Koyama, Wako (JP); Masashi Kai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/447,285

(22) Filed: Mar. 2, 2017

(65) Prior Publication Data

US 2017/0268417 A1    Sep. 21, 2017

(30) Foreign Application Priority Data

Mar. 15, 2016    (JP) .................................. 2016-051649

(51) Int. Cl.
*F02B 63/04*    (2006.01)
*F02B 77/13*    (2006.01)
(Continued)

(52) U.S. Cl.
CPC .......... *F02B 63/044* (2013.01); *F02B 63/048* (2013.01); *F02B 77/13* (2013.01);
(Continued)

(58) Field of Classification Search
CPC .... F02B 63/044; F02B 63/004; F02B 63/048; F02B 77/13; F16M 3/00; F16M 1/00; F16M 2200/08
(Continued)

(56) References Cited

U.S. PATENT DOCUMENTS 2,123,358 A * 7/1938 Grutzner ................. F02B 77/13
                                                              123/198 E
3,039,725 A * 6/1962 Kerley, Jr. ............. B60G 11/00
                                                              248/570
(Continued)

FOREIGN PATENT DOCUMENTS

CN    204458041    7/2015
EP    1 069 295 A2    1/2001
(Continued)

OTHER PUBLICATIONS

European Search Report dated Aug. 1, 2017, 5 pages.

*Primary Examiner* — Michael Safavi
(74) *Attorney, Agent, or Firm* — Rankin, Hill & Clark LLP

(57) ABSTRACT

An engine-driven working machine 10 is a generator where a working unit 15 including an engine 37 and a power generating unit 38 is housed in an outer case 12. A plurality of lower support means 25 are included in the generator 10. The lower support means 25 includes a first vibration isolating support portion 73 disposed between the working unit 15 and the outer case 12, a second vibration isolating support portion 74 formed integrally with the first vibration isolating support portion 73, and a groove portion 75 formed between the first vibration isolating support portion 73 and the second vibration isolating support portion 74. The working unit 15 is supported with the first vibration isolating support portion 73. The outer case 12 is supported with the second vibration isolating support portion 74. A fitting portion 81 of the outer case 12 is fitted to the groove portion 75.

7 Claims, 7 Drawing Sheets

(51) Int. Cl.
*F16M 1/00* (2006.01)
*F16M 3/00* (2006.01)

(52) U.S. Cl.
CPC ............... *F16M 1/00* (2013.01); *F16M 3/00* (2013.01); *F16M 2200/08* (2013.01)

(58) Field of Classification Search
USPC ............................ 60/796, 797; 248/637, 638
See application file for complete search history.

(56) References Cited

U.S. PATENT DOCUMENTS

| | | | | |
|---|---|---|---|---|
| 3,924,597 A * | 12/1975 | Hatz | ................. | F02B 77/13 123/195 C |
| 4,702,201 A | 10/1987 | Odo et al. | | |
| 4,842,095 A * | 6/1989 | Rozek | ................. | F16F 1/37 181/207 |
| 5,141,203 A * | 8/1992 | Baker | ................. | B63H 21/305 248/635 |
| 5,277,554 A * | 1/1994 | Elson | ................. | F04B 39/00 248/638 |
| 5,354,182 A * | 10/1994 | Niemiec | ................. | F01C 21/007 248/638 |
| 5,460,348 A * | 10/1995 | Cox | ................. | F16M 5/00 248/237 |
| 5,464,187 A * | 11/1995 | Linkner, Jr. | ................. | B60R 11/00 248/635 |
| 5,566,047 A * | 10/1996 | Kahn | ................. | H02B 1/48 174/138 G |
| 5,871,199 A * | 2/1999 | Koike | ................. | F16F 1/3732 248/615 |
| 5,915,662 A * | 6/1999 | Itakura | ................. | F16F 1/373 248/561 |
| 5,965,949 A | 10/1999 | Fukuda et al. | | |
| 6,024,338 A * | 2/2000 | Koike | ................. | F16F 1/3732 248/615 |
| 6,912,866 B2 * | 7/2005 | Seo | ................. | F04B 39/0044 181/207 |
| 7,278,834 B2 * | 10/2007 | Herrick | ................. | F04B 39/0044 248/638 |
| 7,510,163 B2 * | 3/2009 | Schlitzkus | ................. | B60T 8/3685 248/548 |
| 7,640,619 B2 * | 1/2010 | Moosmann | ................. | B60S 1/04 15/250.3 |
| 8,016,067 B2 * | 9/2011 | Horgas | ................. | F16F 15/08 180/232 |
| 8,056,880 B2 * | 11/2011 | Tsuchida | ................. | G11B 33/124 248/580 |
| 8,136,894 B2 * | 3/2012 | Blazic | ................. | B60T 17/04 248/635 |
| 8,302,946 B2 * | 11/2012 | Kojima | ................. | F16F 13/16 248/638 |
| 8,308,149 B2 * | 11/2012 | Blazic | ................. | B60T 17/04 248/635 |
| 2008/0086966 A1 * | 4/2008 | Stevens | ................. | E04B 1/84 52/347 |
| 2015/0369329 A1 * | 12/2015 | Guderian | ................. | F16F 15/02 310/89 |

FOREIGN PATENT DOCUMENTS

| | | |
|---|---|---|
| EP | 1 995 431 A1 | 11/2008 |
| EP | 2 138 684 A1 | 12/2009 |
| JP | 60-022029 | 2/1985 |
| JP | 10-205690 | 8/1998 |
| JP | 11-200861 | 7/1999 |
| JP | 2003-027957 | 1/2003 |
| RU | 2169279 | 6/2001 |

* cited by examiner

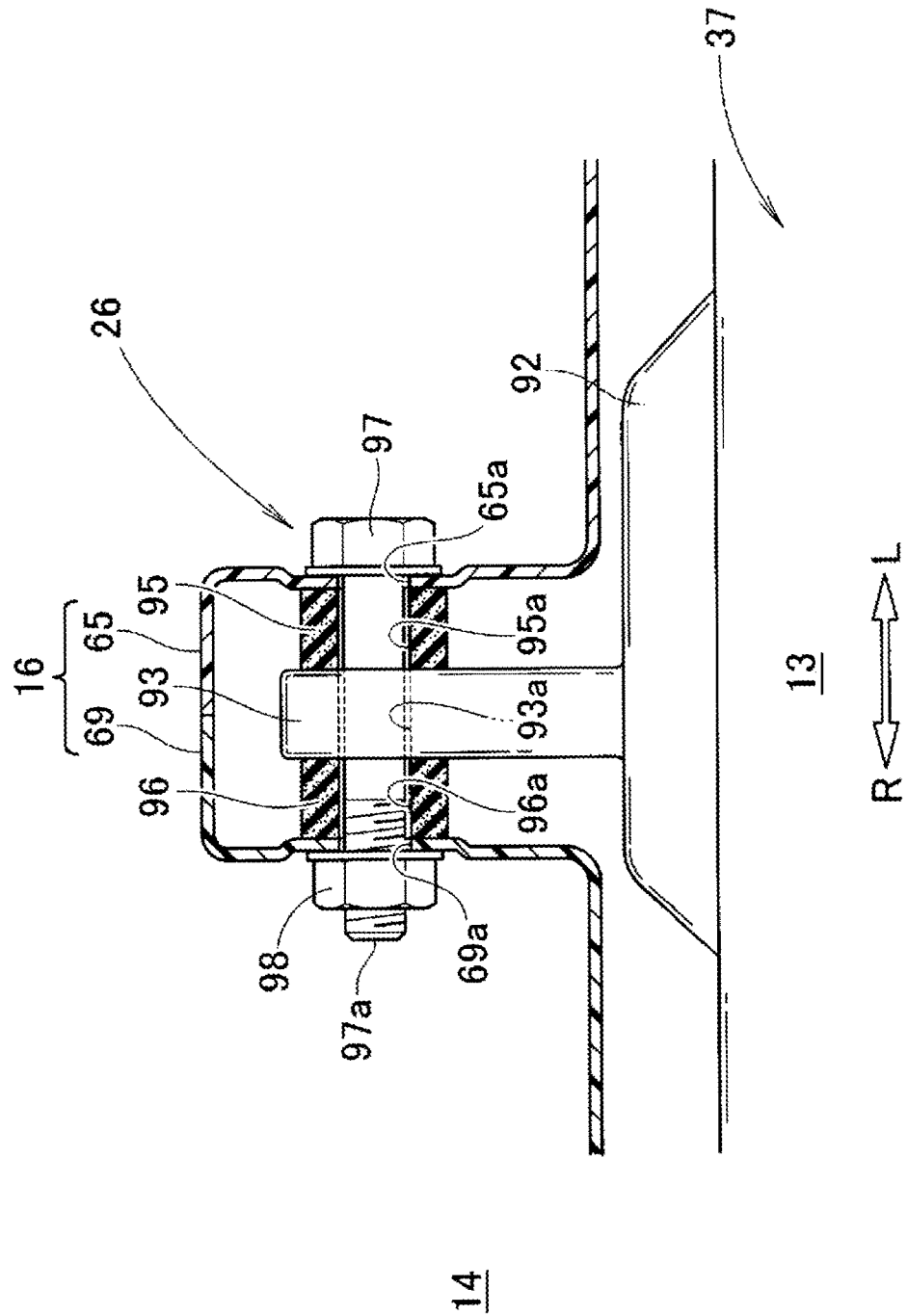

ENGINE-DRIVEN WORKING MACHINE HOUSED IN OUTER CASE WITH VIBRATION ISOLATING SUPPORT

INCORPORATION BY REFERENCE

The present application claims priority under 35 U.S.C. § 119 to Japanese Patent Application No. 2016-051649 filed on Mar. 15, 2016. The content of the application is incorporated herein by reference in its entirety.

BACKGROUND OF THE INVENTION

Field of the Invention

The present invention relates to an engine-driven working machine that has an engine for driving housed in an inside of an outer case.

Description of the Related Art

As an engine-driven working machine, there is known an engine-driven working machine that has an engine and a power generating unit integrally formed, has respective members supported by a frame via vibration isolating members, and is used in a state where the frame is directly placed on the ground (refer to Japanese Patent Laid-Open No. 10-205690, for example.).

Since the engine-driven working machine is used in the state where the frame is directly placed on the ground, it is difficult to suppress vibration of the frame.

As the means for suppressing vibration of the frame, providing vibration isolating members on the bottom portion of the frame is conceivable. By placing the frame on the ground via the vibration isolating members, it becomes possible to suppress vibration of the frame (that is, the engine-driven working machine).

However, by providing the vibration isolating members on the bottom portion of the frame, the number of components increases, and there is a room for improvement from this point of view.

SUMMARY OF THE INVENTION

The present invention addresses a problem to provide an engine-driven working machine that is capable of suppressing vibration without increasing the number of components.

A first aspect of the present invention provides an engine-driven working machine in which an engine is housed in an inside of an outer case, including support means that supports the outer case and the engine, wherein the support means includes a first vibration isolating support portion that is disposed between the engine and the outer case, and supports the engine, a second vibration isolating support portion that is formed integrally with the first vibration isolating support portion, and supports the outer case, and a groove portion that is formed between the first vibration isolating support portion and the second vibration isolating support portion, and allows a fitting portion of the outer case to be fitted to the groove portion.

As above, the support means includes the first vibration isolating support portion, the second vibration isolating support portion and the groove portion. Further, the fitting portion of the outer case is made capable of being fitted to the groove portion. Further, the engine is supported with the first vibration isolating support portion, and the outer case is supported with the second vibration isolating support portion.

Thereby, vibration of the engine and vibration of the outer case (that is, vibration of the engine-driven working machine) can be suppressed with the support means.

Further, by integrally gathering the first vibration isolating support portion and the second vibration isolating support portion in the support means, there is no need to prepare the vibration isolating support portion that supports the engine, and the vibration isolating support portion that supports the outer case individually. Thereby, the number of components is restrained from increasing, and reduction in weight of the engine-driven working machine is achieved.

Further, by fitting the fitting portion of the outer case to the groove portion, an inner surface of the outer case can be brought into contact with the first vibration isolating support portion, and an outer surface of the outer case can be brought into contact with the second vibration isolating support portion. Thereby, the fitting portion of the outer case can be closed with the first vibration isolating support portion and the second vibration isolating support portion.

Thereby, hermeticity of the inside with respect to the outside of the outer case can be secured, and noise reduction of the engine-driven working machine is achieved.

In a second aspect of the present invention, the outer case preferably includes an undercover that is disposed under the engine, and has a first fitting concave portion that is formed into a concave shape to be fittable to one side of the groove portion, and a side case that is disposed at sides of the undercover and the engine, and has a second fitting concave portion that is formed into a concave shape to be fittable to an other side of the groove portion, and the fitting portion is preferably formed of the first fitting concave portion and the second fitting concave portion.

As above, the first fitting concave portion of the fitting portion is formed in the undercover, and the second fitting concave portion of the fitting portion is formed in the side case. Further, the first fitting concave portion is fitted to the one side of the groove portion, and the second fitting concave portion is fitted to the other side of the groove portion.

Thereby, the first fitting concave portion and the second fitting concave portion can be closed with the first vibration isolating support portion and the second vibration isolating support portion. Thereby, the hermeticity of the inside with respect to the outside of the outer case can be secured, and noise reduction of the engine-driven working machine is achieved.

In a third aspect of the present invention, the support means preferably further includes a bolt that is provided integrally with the first vibration isolating support portion, the groove portion and the second vibration isolating support portion, and is capable of being inserted through a mounting portion of the engine, and a nut capable of being screw-connected to the bolt that is inserted through the mounting portion.

As above, the bolt is provided integrally with the first vibration isolating support portion, the groove portion and the second vibration isolating support portion. Further, the bolt is inserted through the mounting portion of the engine, and the nut is screw-connected to the bolt that is inserted.

By providing the bolt integrally with the first vibration isolating support portion, the groove portion and the second vibration isolating support portion, the number of components can be further reduced.

In a fourth aspect of the present invention, the engine-driven working machine preferably further includes fastening means that fastens the undercover and the side case.

As above, the undercover and the side case are fastened with the fastening means. Thereby, the undercover and the side case can be reliably connected, and quality of the engine-driven working machine can be secured.

According to the present invention, the support means includes the first vibration isolating support portion, the second vibration isolating support portion and the groove portion. Further, the engine is supported with the first vibration isolating support portion, and the outer case is supported with the second vibration isolating support portion. Thereby, vibration of the engine-driven working machine can be suppressed without increasing the number of components.

BRIEF DESCRIPTION OF THE DRAWINGS

FIG. 7 is a sectional view taken along line 7-7 in FIG. 1.

DETAILED DESCRIPTION OF THE PREFERRED EMBODIMENT

Figure 1:
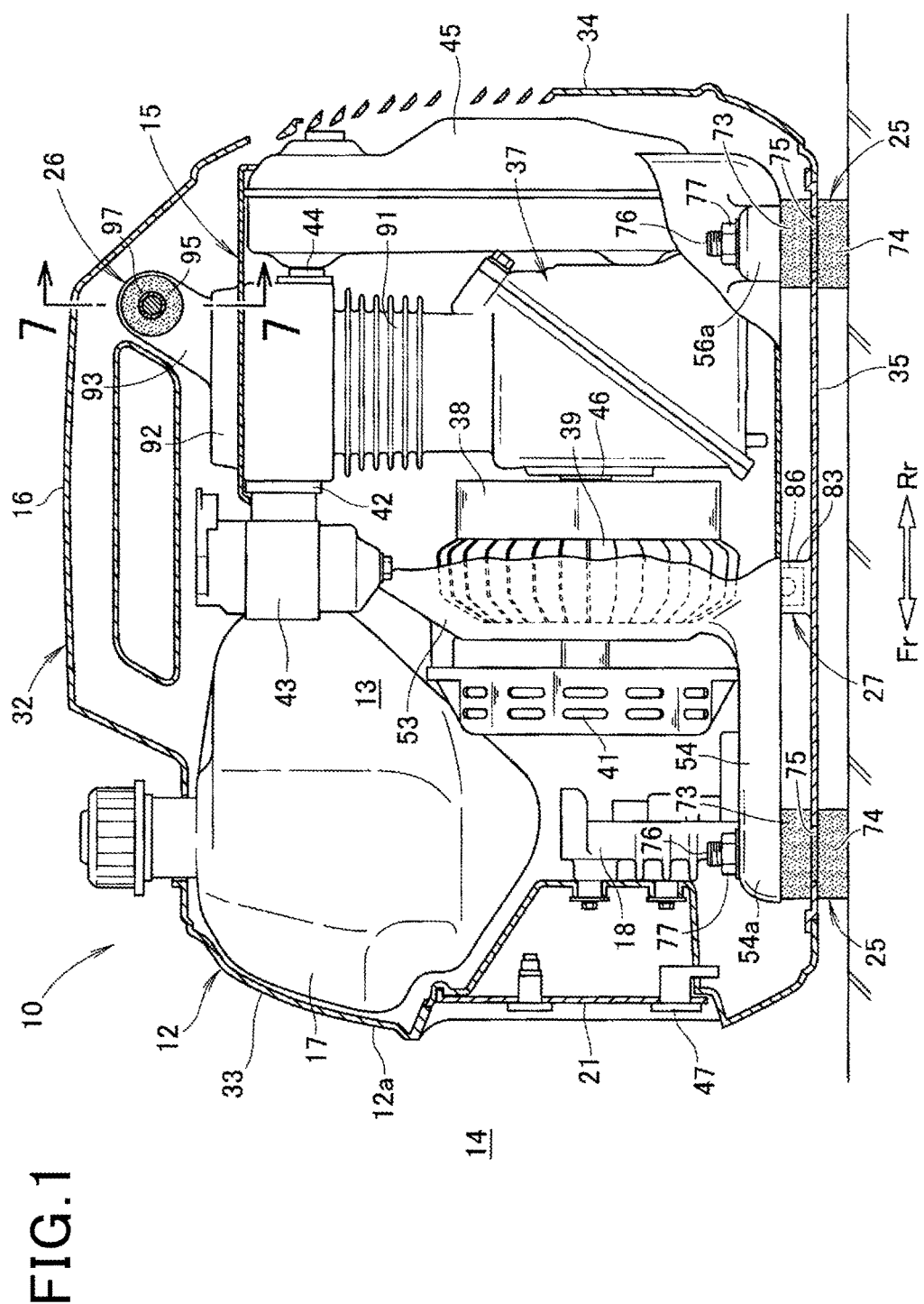
FIG. 1 is a sectional view illustrating an engine-driven working machine according to the present invention.

A best mode for carrying out the present invention will be described hereinafter on the basis of the accompanying drawings.

Note that "a front (Fr)", "a rear (Rr)", "a left (L)" and "a right (R)" shown in the drawings are set based on an operation panel 21 side of an engine-driven working machine 10 as the front (Fr).

Here, in an embodiment, the engine-driven working machine 10 is illustrated as "a generator 10", but it is also possible to apply the engine-driven working machine 10 to the other working machines such as a mowing machine.
<Embodiment>
The engine-driven working machine (more specifically, the generator) 10 according to the embodiment will be described.

As illustrated in FIG. 1, the generator 10 includes an outer case 12 that forms an outer frame of the generator 10, a working unit 15 that is housed in an inside 13 of the outer case 12, a fuel tank 17 that is placed in front of the working unit 15, an inverter 18 that is provided under the fuel tank 17, and an operation panel 21 that is provided on a case front wall 12a of the outer case 12.

The generator 10 includes a plurality of lower support means (support means) 25 that support the outer case 12 and the working unit 15, an upper support means 16 that supports the working unit 15 on the outer case 12, a left fastening means (a fastening means) 27 and a right fastening means (a fastening means) 27 (refer to FIG. 2 in addition) that fasten the outer case 12.

The left fastening means 27 and the right fastening means 27 are formed to be substantially laterally symmetrical, and therefore, will be described hereinafter by assigning the same reference signs to the components of the respective means.

The outer case 12 includes a left side case 31 (refer to FIG. 2) that is disposed at a left side of the fuel tank 17, a right side case 32 that is disposed at a right side of the fuel tank 17, a front case 33 that is disposed at a front side of the fuel tank 17, a rear case 34 that is disposed at a rear side of the fuel tank 17, and an undercover 35 that is disposed under the working unit 15.

Respective lower ends of the left side case 31, the right side case 32, the front case 33 and the rear case 34 are disposed at a perimeter of the undercover 35.

The left side case 31 and the right side case 32 are cases that are formed to be substantially laterally symmetrical. Therefore, the right side case 32 will be described hereinafter, and detailed explanation of the left side case 31 will be omitted.

The working unit 15 includes an engine 37 that is housed in the inside 13 of the outer case 12, a power generating unit (a working unit) 38 that is provided at a front side of the engine 37, a cooling fan 39 that is provided at a front side of the power generating unit 38, a recoil starter 41 that is provided at a front side of the cooling fan 39, a carburetor 43 that connects to an intake port 42 of the engine 37, and a muffler 45 that connects to an exhaust port 44 of the engine 37.

The engine 37, the power generating unit 38 and the cooling fan 39 are integrally connected.

According to the generator 10, the engine 37 is driven by manually turning the recoil starter 41. The engine 37 drives, and thereby a crankshaft 46 rotates. A rotor of the power generating unit 38 is connected to the crankshaft 46. Consequently, the rotor of the power generating unit 38 rotates by the crankshaft 46 rotating, and the power generating unit 38 drives.

The power generating unit 38 drives, whereby an electromotive force is generated in the rotor and a stator, and power generation is performed in the power generating unit 38. Direct-current power that is generated in the power generating unit 38 is converted into alternating-current power in the inverter 18, and power is supplied to an outside from a connector 47 at the operation panel 21.

Further, the cooling fan 39 is connected to the rotor of the power generating unit 38. Thereby, the cooling fan 39 rotates by the rotor of the power generating unit 38 rotating. The cooling fan 39 rotates, whereby outside air is sucked into the inside 13 from an outside 14 of the outer case 12.

The sucked outside air is fed to the fuel tank 17, the inverter 18, the engine 37 and the muffler 47 in sequence as cooling air. Thereby, the fuel tank 17, the inverter 18, the engine 37 and the muffler 45 can be cooled with the cooling air.

Figure 2:
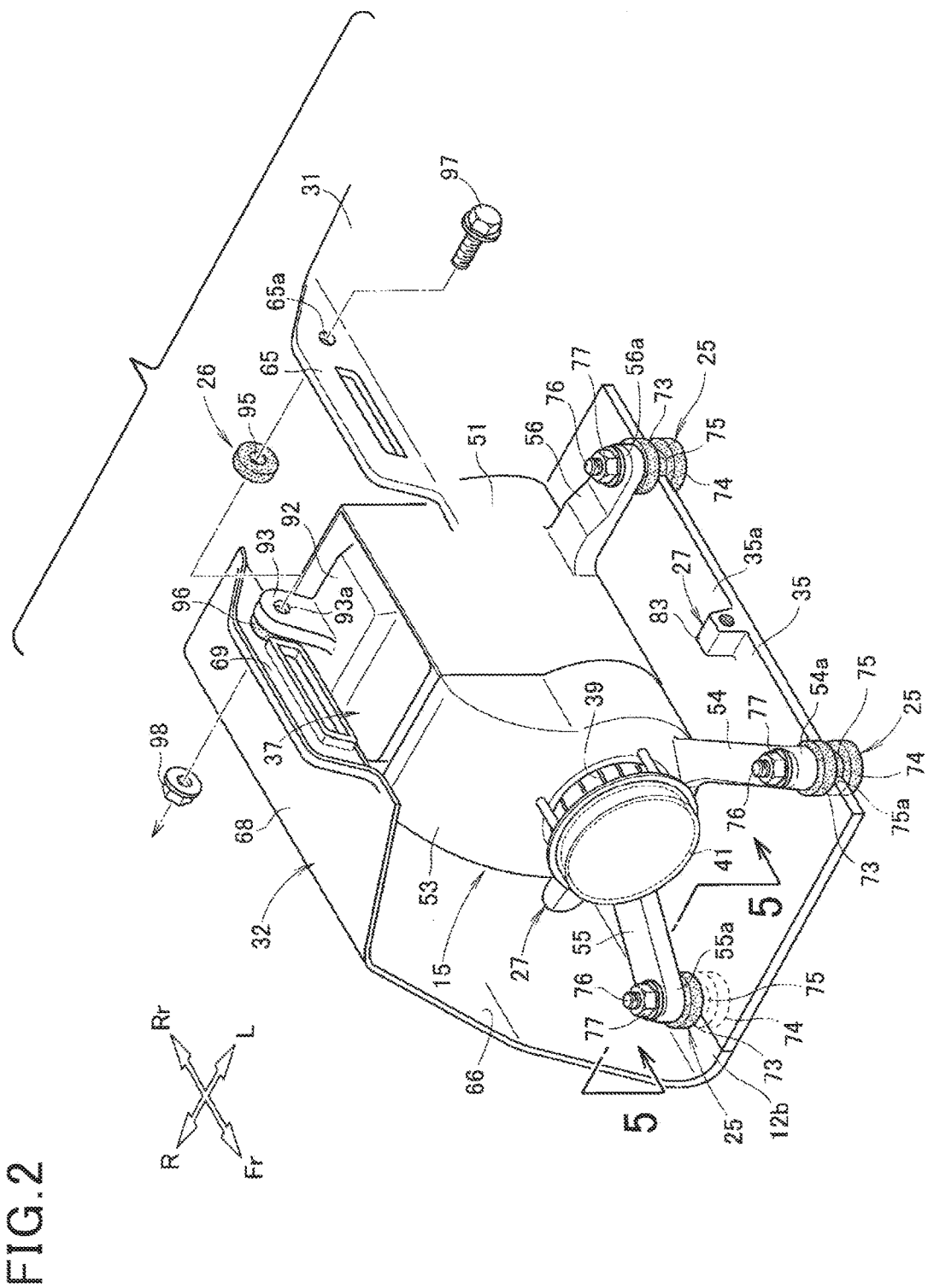
FIG. 2 is a perspective view illustrating a main part of the engine-driven working machine in FIG. 1.

Further, as illustrated in FIG. 2, the working unit 15 includes a left shroud 51 that covers the engine 37 from a left side, a right shroud 52 (refer to FIG. 3) that covers the engine 37 from a right side, and a fan cover 53 that covers the cooling fan 39 and the power generating unit 38 (refer to FIG. 1).

Further, the working unit 15 includes a left front leg portion (a mounting portion of the engine) 54 that is connected to a left front lower end portion of the fan cover 53, a right front leg portion (a mounting portion) 55 that is connected to a right front lower end portion of the fan cover 53, a left rear leg portion (a mounting portion of the engine) 56 that is connected to the left shroud 51, and a right rear leg portion (a mounting portion of the engine) (not illustrated) that is connected to the right shroud 52.

Figure 3:
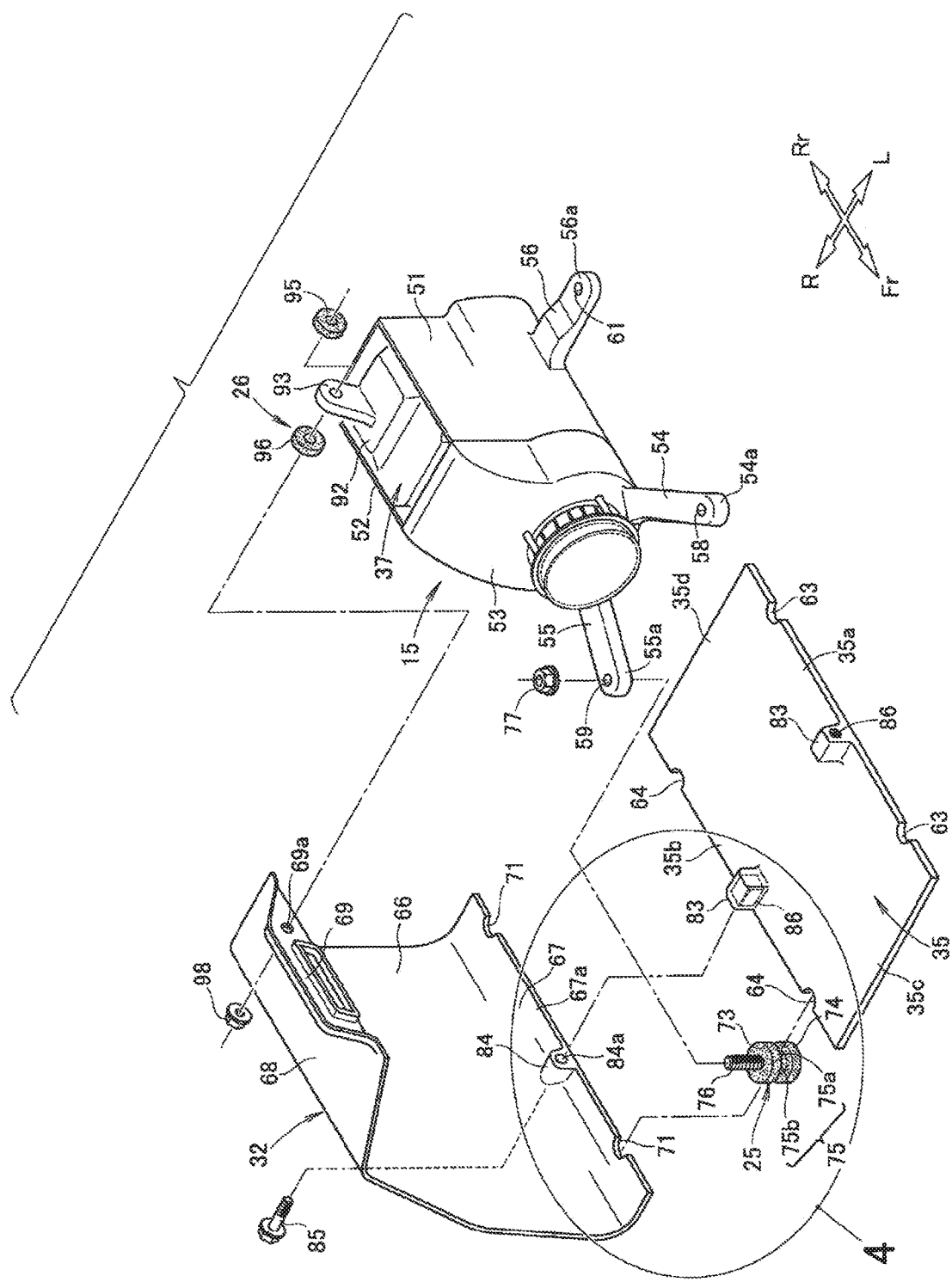
FIG. 3 is an exploded perspective view illustrating the engine-driven working machine in FIG. 2.

As illustrated in FIG. 3, the left front leg portion 54 is extended in an inclined shape to a left front side from the left front lower end portion of the fan cover 53, and a mounting hole 58 is formed in a distal end portion 54a of the left front leg portion 54. Further, the right front leg portion 55 is extended in an inclined shape to a right front side from the right front lower end portion of the fan cover 53, and a mounting hole 59 is formed in a distal end portion 55a of the right front leg portion 55.

Further, the left rear leg portion 56 is extended to a left side from a lower end portion of the left shroud 51, and a mounting hole 61 is formed in a distal end portion 56a of the left rear leg portion 56. Further, the right rear leg portion is extended to a right side from a lower end portion of the right shroud 52, and a mounting hole (not illustrated) is formed in a distal end portion of the right rear leg portion.

As illustrated in FIG. 2, the left front leg portion 54, the right front leg portion 55, the left rear leg portion 56 and the right rear leg portion are respectively supported by the respective lower support means 25 (the lower support means 25 that supports the right rear leg portion is not illustrated).

The left front leg portion 54 and the right front leg portion 55 are leg portions that are formed to be substantially laterally symmetrical. Further, the left rear leg portion 56 and the right rear leg portion are leg portions that are formed to be substantially laterally symmetrical.

Returning to FIG. 3, the undercover 35 has a left side 35a that is located at a left side of the working unit 15, a right side 35b that is located at a right side of the working unit 15, a front side 35c that is located at a front side of the working unit 15, and a rear side 35d that is located at a rear side of the working unit 15.

The undercover 35 is formed to be substantially rectangular in plan view by the left side 35a, the right side 35b, the front side 35c and the rear side 35d.

Further, the undercover 35 has a plurality of first left fitting concave portions (first fitting concave portions) 63 that are respectively formed into concave shapes in a vicinity of a front end and in a vicinity of a rear end of the left side 35a, and a plurality of first right fitting concave portions (first fitting concave portions) 64 that are respectively formed into concave shapes in a vicinity of a front end and in a vicinity of a rear end of the right side 35b.

The first left fitting concave portion 63 is formed into a concave shape. The first left fitting concave portion 63 is fitted to a one side 75a (refer to FIG. 2) of a groove portion 75 of the lower support means 25.

Further, the first right fitting concave portion 64 is formed into a concave shape similarly to the first left fitting concave portion 63. The first right fitting concave portion 64 is fitted to the one side 75a of the groove portion 75 of the lower support means 25.

The first left fitting concave portion 63 and the first right fitting concave portion 64 are concave portions that are formed to be substantially laterally symmetrical.

The right side case 32 has a side wall 66 that is disposed at a right side of the working unit 15, a lower projected portion 67 that is projected toward the right side 35b of the undercover 35 from a lower side of the side wall 66, an upper projected portion 68 that is projected toward above the working unit 15 from an upper side of the side wall 66, and a grip 69 that is raised upward from an inner side of the upper projected portion 68.

The lower projected portion 67 has a side 67a that is butted to the right side 35b of the undercover 35 from a left side, and a plurality of second fitting concave portions 71 that are respectively formed into concave shapes in a vicinity of a front end and in a vicinity of a rear end of the side 67a. The side 67a of the lower projected portion 67 is disposed at a right side of the undercover 35.

Further, the second fitting concave portion 71 is formed into the concave shape. The second fitting concave portion 71 is fitted to the other side 75b of the groove portion 75 of the lower support means 25.

Figure 4:
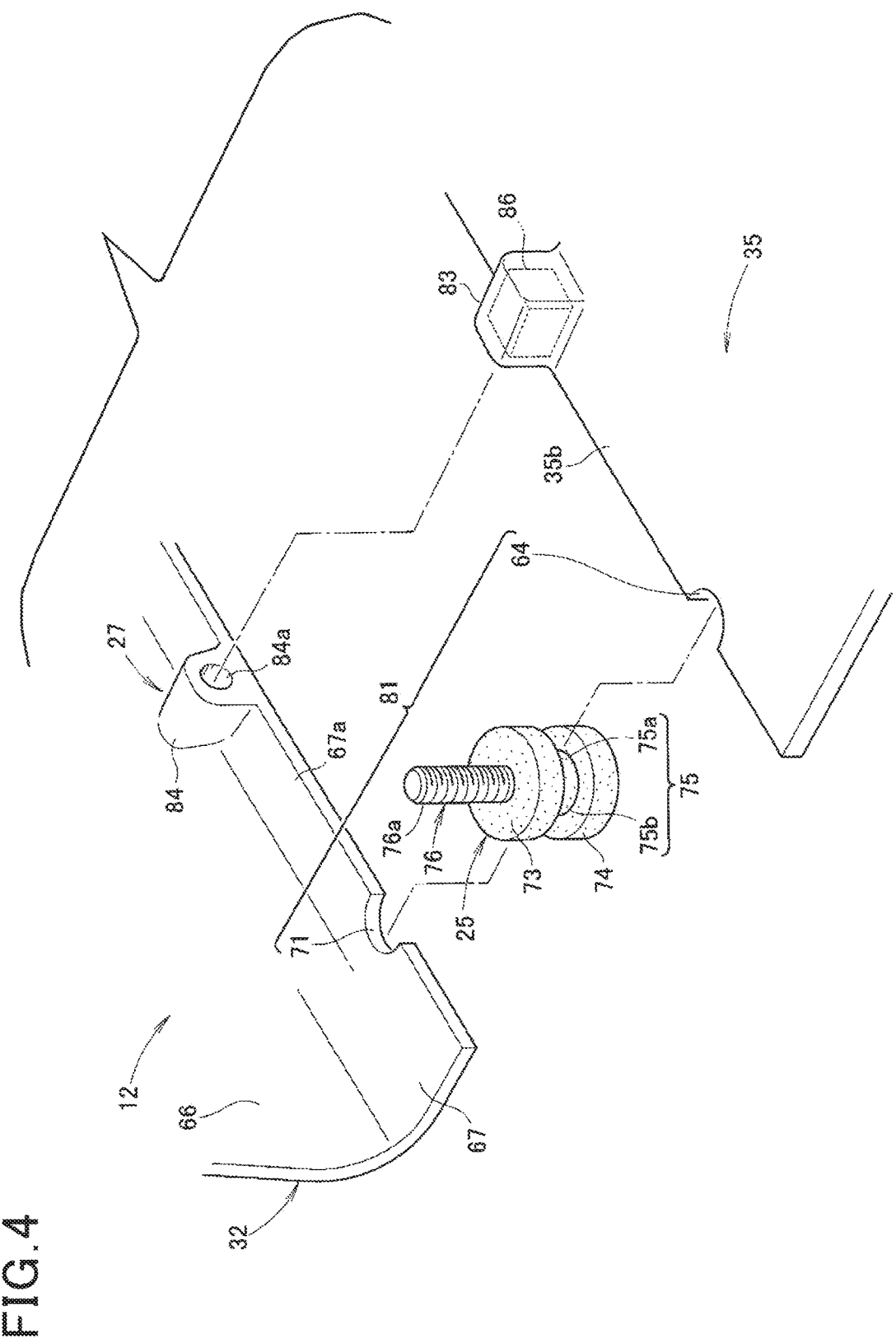
FIG. 4 is an enlarged view of part 4 in FIG. 3.
Figure 5:
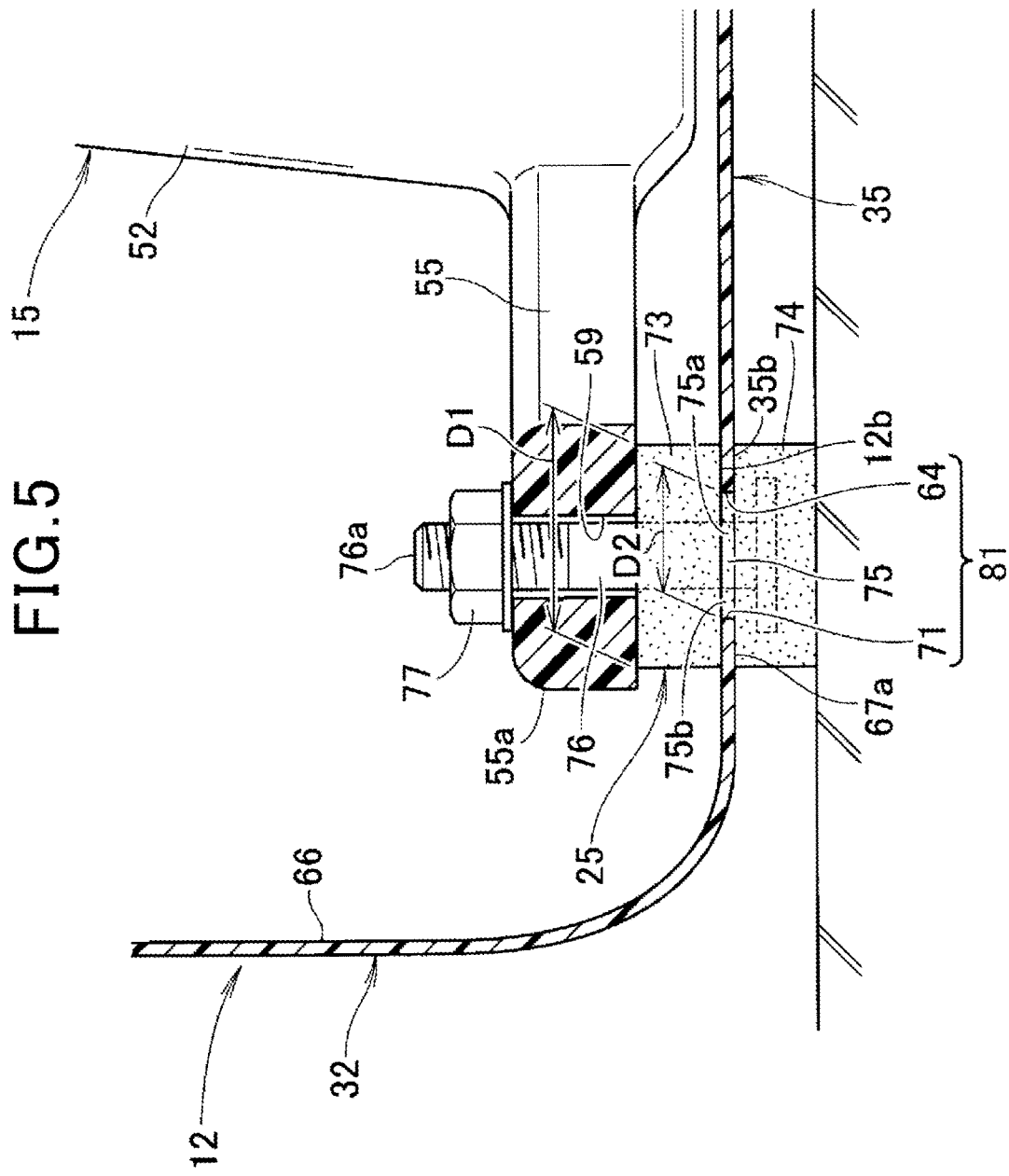
FIG. 5 is a sectional view taken along line 5-5 in FIG. 2.

As illustrated in FIG. 4 and FIG. 5, a fitting portion 81 is formed into a circular shape by the first right fitting concave portion 64 and the second fitting concave portion 71. The fitting portion 81 is formed in a lower portion 12b of the outer case 12. Further, the lower portion 12b of the outer case 12 is formed by the right side 35b of the undercover 35 and the side 67a of the lower projected portion 67.

The fitting portion 81 is fitted to the lower support means 25.

The lower support means 25 includes a first vibration isolating support portion 73, a second vibration isolating support portion 74, the groove portion 75, a bolt 76 and a nut 77. The first vibration isolating support portion 73, the second vibration isolating support portion 74 and the groove portion 75 are integrally molded from a rubber material. Further, the bolt 76 is integrally insert-molded in the first vibration isolating support portion 73, the second vibration isolating support portion 74 and the groove portion 75.

The first vibration isolating support portion 73 is a rubber member that is disposed between the distal end portion 55a of the right front leg portion 55 and the lower portion 12b of the outer case 12, and is formed to have an outside diameter D1.

The first vibration isolating support portion 73 is disposed between the distal end portion 55a of the right front leg portion 55 and the lower portion 12b of the undercover 35, whereby the distal end portion 55a of the right front leg portion 55 is supported by the first vibration isolating support portion 73.

The second vibration isolating support portion 74 is integrally formed on the first vibration isolating support portion 73 via the groove portion 75. The second vibration isolating support portion 74 is a rubber member that is disposed at a lower side of the lower portion 12b of the undercover 35, and is formed to have the outside diameter D1 similarly to the first vibration isolating support portion 73.

The second vibration isolating support portion 74 is disposed at the lower side of the lower portion 12b of the undercover 35, whereby the lower portion 12b of the undercover 35 is supported with the second vibration isolating support portion 74.

The groove portion 75 is disposed between the first vibration isolating support portion 73 and the second vibration isolating support portion 74, and the groove portion 75 is formed integrally with the first vibration isolating support portion 73 and the second vibration isolating support portion 74. The groove portion 75 is formed to have an outside diameter D2 that is a smaller diameter than the diameters of the first vibration isolating support portion 73 and the second vibration isolating support portion 74. Thereby, the groove portion 75 is formed into a ring shape between the first vibration isolating support portion 73 and the second vibration isolating support portion 74.

In this way, the first vibration isolating support portion 73, the second vibration isolating support portion 74 and the groove portion 75 are integrally gathered as the lower support means 25. Thereby, the vibration isolating support portion that supports the working unit 15 and the vibration isolating support portion that supports the outer case 12 do not have to be individually prepared. Thereby, the number of components is restrained from increasing, and reduction in weight of the generator 10 is achieved.

The first right fitting concave portion 64 is fitted to the one side 75a of the groove portion 75, and the second fitting concave portion 71 is fitted to the other side 75b of the groove portion 75. Here, the fitting portion 81 is formed into a circular shape in the lower portion 12b of the outer case 12 by the first right fitting concave portion 64 and the second fitting concave portion 71. Thereby, the fitting portion 81 is fitted to the groove portion 75.

In this state, the side 67a of the lower projected portion 67 is butted to the right side 35b of the undercover 35 from a left side to be in a state where the side 67a is in contact with the right side 35b.

The bolt 76 is integrally insert-molded in first vibration isolating support portion 73, the second vibration isolating support portion 74 and the groove portion 75. By providing the bolt 76 integrally with the first vibration isolating support portion 73, the groove portion 75 and the second vibration isolating support portion 74, the bolt 76 does not have to be individually provided. Thereby, the number of components of the lower support means 25 can be further reduced.

In a state where the bolt 76 is integrally insert-molded in the first vibration isolating support portion 73, the second vibration isolating support portion 74 and the groove portion 75, a threaded portion 76a of the bolt 76 protrudes upward from the first vibration isolating support portion 73. The protruded threaded portion 76a is inserted through the mounting hole 59 of the right front leg portion 55 from below, and protrudes upward from the mounting hole 59. A nut 77 is screw-connected to the protruded threaded portion 76a.

In this state, the distal end portion 55a of the right front leg portion 55 is supported with the first vibration isolating support portion 73. Further, the lower portion 12b (more specifically, a right front portion of the lower portion 12b) of the undercover 35 is supported with the second vibration isolating support portion 74.

Likewise, as illustrated in FIG. 2, the distal end portion 54a of the left front leg portion 54 of the working unit 15, the distal end portion 56a of the left rear leg portion 56 and the distal end portion of the right rear leg portion are supported with the first vibration isolating support portions 73 of the respective lower support means 25.

Further, the left front portion, the left rear portion and the right rear portion of the lower portion 12b of the undercover 35 are respectively supported with the second vibration isolating support portions 74 of the respective lower support means 25.

That is, the working unit 15 is supported with the plurality of first vibration isolating support portions 73. Further, the lower portion 12b of the outer case 12 is supported with the plurality of second vibration isolating support portions 74. Thereby, vibration of the working unit 15 and vibration of the outer case 12 (that is, vibration of the generator 10) can be suppressed with the plurality of lower support means 25.

Further, as illustrated in FIG. 5, the nut 77 is screw-connected to the threaded portion 76a of the bolt 76, whereby the first vibration isolating support portion 73 is brought into contact with an inner surface of the lower portion 12b of the outer case 12. Further, the second vibration isolating support portion 74 is brought into contact with an outer surface of the lower portion 12b of the outer case 12.

Thereby, the fitting portion 81 of the outer case 12 can be closed with the first vibration isolating support portion 73 and the second vibration isolating support portion 74.

Likewise, the other fitting portions 81 of the outer case 12 can be closed with the first vibration isolating support portions 73 and the second vibration isolating support portions 74 of the other lower support means 25.

Thereby, hermeticity of the inside 13 with respect to the outside 14 of the outer case 12 is secured, and noise reduction of the generator 10 is achieved.

Figure 6:
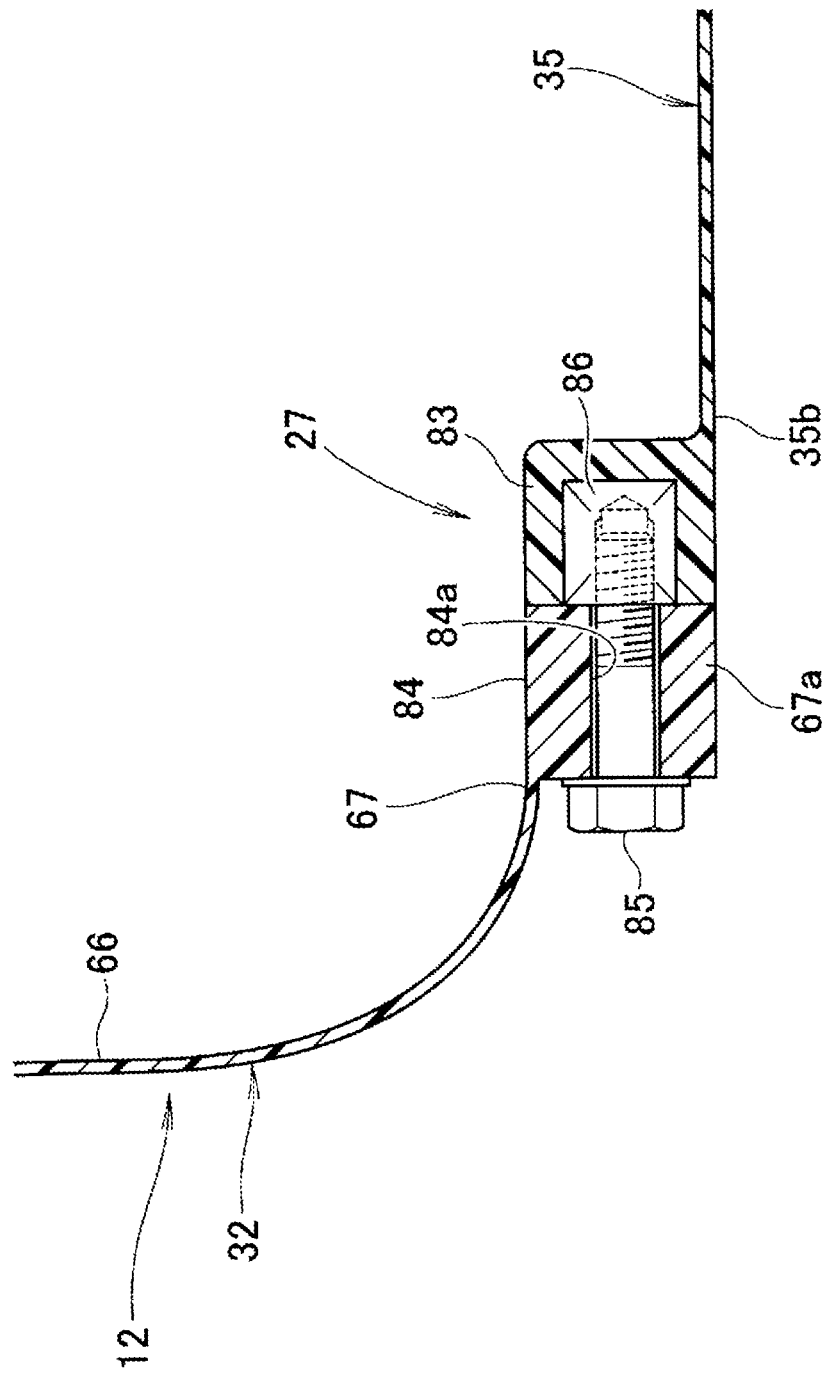
FIG. 6 is a sectional view illustrating right fastening means in FIG. 3.

As illustrated in FIGS. 4 and 6, the right side 35b of the undercover 35 and the side 67a of the lower projected portion 67 are fastened with the right fastening means 27. The right fastening means 27 includes a cover protruded portion 83 that is formed at the right side 35b of the undercover 35, a case protruded portion 84 that is formed at the side 67a of the lower projected portion 67, a bolt 85 that is inserted through an insertion hole 84a of the case protruded portion 84, and a nut 86 to which the bolt 85 is screw-connected.

The nut 86 is integrally insert-molded in an inside of the cover protruded portion 83.

The bolt 85 is inserted through the insertion hole 84a of the case protruded portion 84, and is screw-connected to the nut 86. Thereby, the case protruded portion 84 and the cover protruded portion 83 are connected with the bolt 85 and the nut 86. Thereby, the right side 35b of the undercover 35 and the side 67a of the lower projected portion 67 (that is, the right side case 32) are reliably connected with the right fastening means 27.

Returning to FIG. 2, the left fastening means 27 is formed to be substantially laterally symmetrical to the right fastening means 27. Thereby, the left side 35a of the undercover 35 and the left side case 31 are reliably connected, with the left fastening means 27.

Thereby, the right side case 32 and the left side case 31 are reliably mounted to the undercover 35, and quality of the generator 10 is secured.

As illustrated in FIGS. 1 and 2, a cylinder head 92 is provided at a cylinder 91 of the engine 37, and an arm 93 is protruded upward from the cylinder head 92. A mounting hole 93a is formed in the arm 93. The arm 93 is supported with an upper support means 26 in a state where the arm 93 is disposed between a grip 65 of the left side case 31 and the grip 69 of the right side case 32.

A mounting hole 65a is formed in the grip 65 at the left side. Further, a mounting hole 69a (refer to FIG. 7) is formed in the grip 69 at the right side. A grip 16 of the outer case 12 is formed by the grip 65 at the left side and the grip 69 at the right side.

As illustrated in FIGS. 2 and 7, the upper support means 26 includes a left vibration isolating support portion 95 that is disposed at a left side of the arm 93, a right vibration isolating support portion 96 that is disposed at a right side of the arm 93, a bolt 97 that is inserted through the left vibration isolating support portion 95 and the right vibration isolating support portion 96, and a nut 98 that is screw-connected to the bolt 97.

The left vibration isolating support portion 95 is formed of a rubber member similarly to the first vibration isolating support portion 73, the second vibration isolating support portion 74 and the groove portion 75 of the lower support means 25. The left vibration isolating support portion 95 is a ring-shaped member, and has an insertion hole 95a.

The right vibration isolating support portion 96 is formed of a rubber member into a ring shape similarly to the left vibration isolating support portion 95, and has an insertion hole 96a.

The bolt 97 is inserted through the mounting hole 65a of the grip 65 at the left side, the insertion hole 95a of the left vibration isolating support portion 95, the mounting hole 93a of the arm 93, the insertion hole 96a of the right vibration isolating support portion 96, and the mounting hole 69a of the grip 69 at the right side, from the left side.

A threaded portion 97a of the bolt 97 is protruded from the mounting hole 69a of the grip 69 at the right side, and the nut 98 is screw-connected to a threaded portion 97a of the protruded bolt 97.

In this state, the arm 93 is supported with the left vibration isolating support portion 95 and the right vibration isolating support portion 96. Thereby, vibration of the arm 93 (that is, the working unit 15) can be suppressed with the upper support means 26.

Further, the nut 98 is screw-connected to the threaded portion 97a of the bolt 97, whereby the left vibration isolating support portion 95 is brought into contact with an inner surface of the grip 69 at the left side, and the mounting hole 69a of the grip 69 is closed with the left vibration isolating support portion 95.

Likewise, the right vibration isolating support portion 96 is brought into contact with the inner surface of the grip 69 at the right side, and the mounting hole 69a of the grip 69 is closed with the right vibration isolating support portion 96.

Thereby, hermeticity of the inside 13 with respect to the outside 14 of the outer case 12 can be secured, and noise reduction of the generator 10 is achieved more favorably.

Note that the engine-driven working machine according to the present invention is not limited to the aforementioned embodiment, and can be properly modified, and altered.

For example, in the aforementioned embodiment, the example of being equipped with the four lower support means 25 as the plurality of lower support means 25 is described, but the present invention is not limited to this, and it is possible to select the number of lower support means 25 properly.

Further, in the present embodiment, the example of including the left fastening means 27 and the right fastening means 27 is described, but the present invention is not limited to this, and the number of fastening means can be properly selected.

Furthermore, the shapes and the configurations of the generator, the outer case, the working unit, the lower support means, the left and right fastening means, the left and right side cases, the undercover, the engine, the left front leg portion, the right front leg portion, the left rear leg portion, the first left fitting concave portion, the first right fitting concave portion, the second fitting concave portion, the first vibration isolating support portion, the second vibration isolating support portion, the groove portion, the bolts, the nuts, the fitting portions of the outer case and the like are not limited to the shapes and the configurations that are illustrated, but can be properly changed.

The present invention is suitable for application to the engine-driven working machine that has the engine housed in the inside of the outer case, and drives the working unit by the engine.

REFERENCE SIGNS LIST

10 Generator (engine-driven working machine)
12 Outer case
13 Inside of outer case
15 Working unit
25 Lower support means (support means)
27 Left and right fastening means (fastening means)
31, 32 Left and right side cases (side cases)
35 Undercover
37 Engine
54 Left front leg portion (mounting portion of engine)
55 Right front leg portion (mounting portion of engine)
56 Left rear leg portion (mounting portion of engine)
58, 59, 61 Mounting hole
63 First left fitting concave portion (first fitting concave portion)
64 First right fitting concave portion (first fitting concave portion)
71 Second fitting concave portion
73 First vibration isolating support portion
74 Second vibration isolating support portion
75 Groove portion
75a One side of groove portion
75b The other side of groove portion
76 Bolt
77 Nut
81 Fitting portion of outer case

What is claimed is:

1. An engine-driven working machine in which an engine is housed in an inside of an outer case, comprising:
    support means that supports the outer case and the engine by physical contact therewith,
    wherein the support means includes
    a first vibration isolating support portion that is disposed between the engine and the outer case, and supports the engine,
    a second vibration isolating support portion that is formed integrally with the first vibration isolating support portion, and supports the outer case, and
    a groove portion that is formed between the first vibration isolating support portion and the second vibration isolating support portion, and allows a fitting portion of the outer case to be fitted to the groove portion,
    wherein the outer case includes
    an undercover that is disposed under the engine, the undercover having a first fitting concave portion that is formed in a concave shape to be fitted to an undercover side of the groove portion of the support means, and
    a side case that is separate from the undercover, the side case disposed at a side of the undercover, the side case having a second fitting concave portion that is formed in a concave shape to be fitted to a side case side of the groove portion of the support means, and
    the fitting portion of the outer case is formed of the first fitting concave portion and the second fitting concave portion.

2. The engine-driven working machine according to claim 1,
    wherein the support means further includes
    a bolt that is provided integrally with the first vibration isolating support portion, the groove portion and the second vibration isolating support portion, and is capable of being inserted through a mounting portion of the engine, and
    a nut capable of being screw-connected to the bolt that is inserted through the mounting portion.

3. The engine-driven working machine according to claim 1, further comprising:
    fastening means that fastens the undercover and the side case.

4. The engine-driven working machine according to claim 2, further comprising:
    fastening means that fastens the undercover and the side case.

5. The engine-driven working machine according to claim 1, wherein the undercover and the side case are separate pieces joined to one another and the support means with the first fitting concave portion fitted to the undercover side of the groove portion of the support means and the second fitting concave portion fitted to the side case side of the groove portion of the support means.

6. The engine-driven working machine according to claim 3, wherein the undercover and the side case are separate pieces fastened to one another and joined with the support means with the first fitting concave portion fitted to the undercover side of the groove portion of the support means and the second fitting concave portion fitted to the side case side of the groove portion of the support means.

7. The engine-driven working machine according to claim 4, wherein the undercover and the side case are separate pieces fastened to one another and joined with the support means with the first fitting concave portion fitted to the undercover side of the groove portion of the support means and the second fitting concave portion fitted to the side case side of the groove portion of the support means.

\* \* \* \* \*